United States Patent [19]
Paul et al.

[11] 3,927,339
[45] Dec. 16, 1975

[54] FREQUENCY TRANSMITTERS FOR PRODUCING CONTROL SIGNALS CONTROLLING THE BRAKE FORCE IN MOTOR VEHICLE WHEELS

[75] Inventors: Jurgen Paul; Walter Kostelezky, both of Stuttgart; Paul Schwerdt, Schnait, all of Germany

[73] Assignee: Daimler-Benz Aktiengesellschaft, Germany

[22] Filed: Aug. 28, 1974

[21] Appl. No.: 501,359

Related U.S. Application Data
[63] Continuation of Ser. No. 312,512, Dec. 6, 1972.

[30] Foreign Application Priority Data
Dec. 7, 1971 Germany............................ 2160536

[52] U.S. Cl.................................. 310/155; 310/168
[51] Int. Cl.² ..................................... H02K 21/38
[58] Field of Search ............ 310/155, 168, 153, 154

[56] References Cited
UNITED STATES PATENTS

| | | | |
|---|---|---|---|
| 3,482,130 | 12/1969 | Woodward.......................... | 310/155 |
| 3,719,841 | 3/1973 | Ritsema.............................. | 310/155 |
| 3,769,533 | 10/1973 | Pauwels.............................. | 310/155 |
| 3,801,845 | 4/1974 | Gavitt, Sr............................ | 310/168 |

FOREIGN PATENTS OR APPLICATIONS

| | | | |
|---|---|---|---|
| 2,103,381 | 8/1972 | Germany.......................... | 310/168 |

*Primary Examiner*—Donovan F. Duggan
*Attorney, Agent, or Firm*—Craig & Antonelli

[57] ABSTRACT

A frequency transmitter for producing signals to control the brake force at the wheels of motor vehicles, which includes a rotating toothed arrangement secured at the circumference of each output shaft of the differential gear cooperating with a stationary tooth arrangement disposed in an insert member arranged in the bearing cover of the differential gear between the tapered roller bearing assembly for the axle drive bevel wheel or the differential gear housing and a retaining ring providing an external seal or the like. The insert member is non-rotatably inserted axially from the outside into the bearing cover of the differential gear and accommodates the stationary tooth arrangement which includes the coil carrier as well as two stationary teeth and a permanent magnet of high energy yield.

34 Claims, 2 Drawing Figures

FREQUENCY TRANSMITTERS FOR PRODUCING CONTROL SIGNALS CONTROLLING THE BRAKE FORCE IN MOTOR VEHICLE WHEELS

This is a continuation of application Ser. No. 312,512, filed Dec. 6, 1972.

The present invention relates to a frequency transmitter combined with a differential gear for the generation or transmission of signals to control the brake force at the wheels of motor vehicles, which is arranged in the bearing cover of the differential gear between the bearing for the axle-drive bevel wheel or the differential gear housing and the retaining ring forming an oil seal against the outside or the like, as disclosed in German Patent application P 21 03 381.8.

In the aforementioned arrangement according to the prior patent application, the frequency transmitter or pick-up is combined with the differential gear for the transmission of signals to control the slippage of the wheels of automotive vehicles, which consists of two serrations cooperating with each other, of which one is non-rotatably arranged whereas the other rotates, one of the two serrations being magnetically excitable. The frequency transmitter or pick-up is arranged directly in the bearing cover of the differential gear between the bearing for the axle-drive bevel wheel housing and a retaining ring or the like providing a seal toward the outside. It has now been discovered that by reason of the unavoidable impacts of the output or driven shafts of the differential gear assembly, a relatively large tolerance or play has to be provided at the teeth of the frequency pick-up or transmission. Consequently, only relatively weak signals can be produced by means of this frequency transmitter, particularly as the magnetic circuit cannot be focused or concentrated sufficiently sharply without further measures as a result of the arrangement in the bearing cover. Additionally, with this arrangement always the entire bearing cover together with the bearing support has to be removed for the exchange of the frequency transmitter and then has to be readjusted during re-assembly.

The present invention is therefore concerned with the task to improve in that regard the arrangement of the aforementioned patent application. Accordingly, an easier assembly or exchange possibility and a stronger signal generation is to be achieved by the present invention.

The underlying problems are solved according to this invention in connection with the arrangement according to the aforementioned prior patent application in that an annular or ring-shaped insert member is non-rotatably inserted along the axis of each output or driven shaft from the outside thereof into the bearing cover of the differential gear, which annular insert member accommodates the coil carrier as well as two stationary teeth and a permanent magnet of high energy yield. This means, two active teeth are coordinated according to the present invention to the permanent magnet. It is thereby particularly appropriate if according to a further proposal of the present invention the insert member consists of a non-magnetic material. For example, aluminum die-casting or a synthetic plastic (resinous) material of any conventional type which, however, must then be particularly temperature-resisting may be used as the non-magnetic material.

The construction according to the present invention entails the advantage that the frequency transmitter can be assembled or interchanged without removal of the bearing cover. The advantageous possibility of a sharp concentration of the magnetic flux results therefrom because the insert member can now be made of material other than the material of the bearing cover. As a result of this type of construction, the high energy of the permanent magnet provided according to the present invention is still further favorably influenced so that in cooperation with the provided two active teeth a strong signal can be achieved also with a relatively large gap at the teeth.

A further feature of the present invention resides in that the annular insert member also assumes the cable guidance and serves simultaneously as support for the oil seal retaining ring. Further advantages as regards assembly and machining result therefrom.

In one embodiment of the present invention, the permanent magnet is constructed as axially polarized ring magnet and is inserted into the ring-shaped insert member whereby it accommodates concentrically within the same the coil carrier together with the coil. Another possibility resides in that several rod magnets are uniformly distributed along the circumference of the coil. In both cases, it is proposed according to the present invention that one disk each of magnetizable material is arranged axially on both sides of the structural unit constituted by the coil carrier and permanent magnet, whereby each disk is provided at the inner circumference with a tooth means while both disks assume an identical circumferential position in relation to these tooth means.

This can be realized in detail in that cams or the like are arranged at the coil carrier which engage without play in corressponding openings at both disks. These cams may be mutually offset on both sides, for example, by a multiple of a tooth pitch or they can also be located in an identical manner. Of course, also the alignment with respect to the ring magnet or also with respect to the insert member can take place in a similar manner.

It is further proposed by the present invention that a common continuous tooth means is disposed opposite the tooth means of the two disks which is arranged on a sleeve slipped over the output or driven shaft of the differential gear assembly. Another inventive feature resides in that a pocket of synthetic plastic material or other insulating material is mounted externally on the axially outwardly disposed disk, which pocket receives the coil connections. Finally, it is further proposed that the insert member is provided with a bore or a channel for the connecting lines as well as with an eye with a larger opening for the accommodation of the seal for the feed cable.

Accordingly, it is an object of the present invention to provide a ring-shaped frequency transmitter for the generation of signals used to control the brake force in motor vehicle wheels, which avoids by simple means the aforementioned shortcomings and drawbacks encountered in the prior art.

Another object of the present invention resides in a ring-shaped frequency transmitter for the signal generation to control the brake force at motor vehicle wheels which permits the realization of relatively strong signals by the ability to concentrate the magnetic flux in predetermined paths.

A further object of the present invention resides in a ring-shaped frequency transmitter for producing signals of the aforementioned type which greatly facilitates manufacture, installation and exchange of the pick-up and its parts.

These and other objects, features and advantages of the present invention will become more apparent from the following description when taken in connection with the accompanying drawing which shows, for purposes of illustration only, two embodiments in accordance with the present invention, and wherein.

Figure 1:
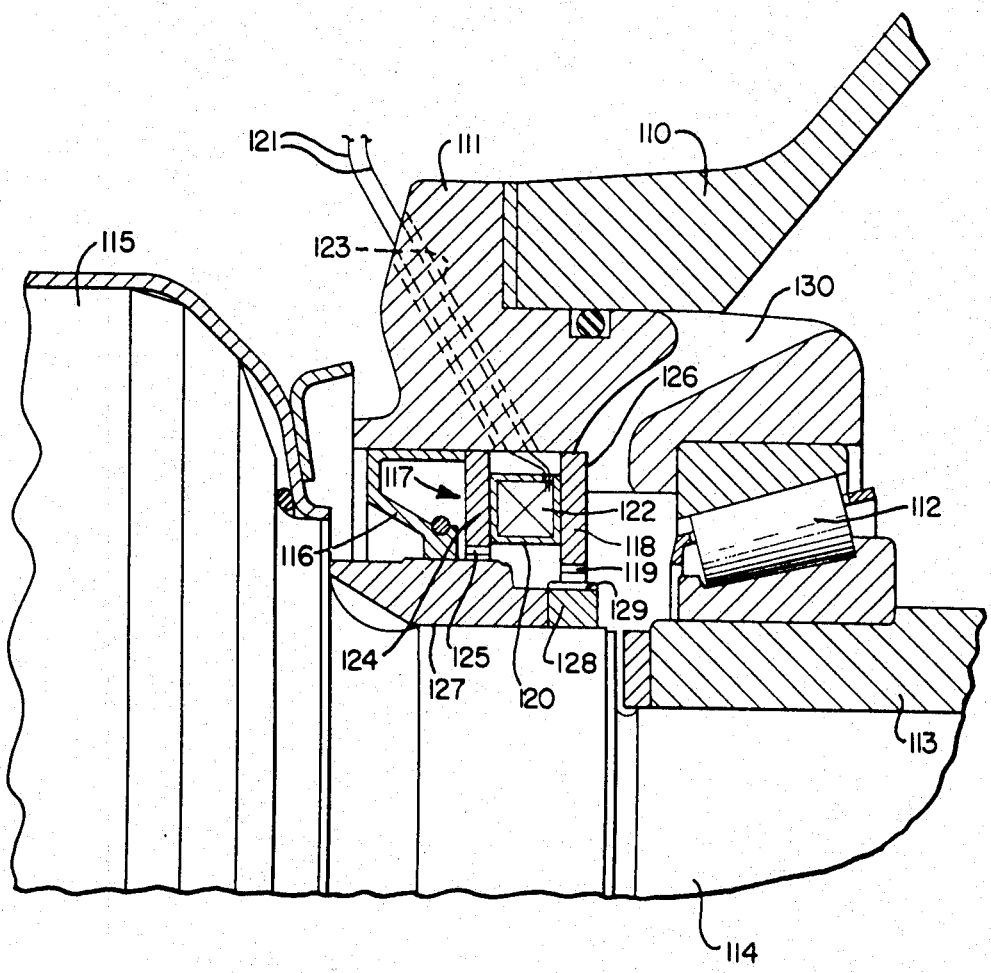
FIG. 1 is a partial cross-sectional view of a prior art frequency transmitter such as disclosed in the aforementioned German Patent Application.

Referring now to the drawing and more particularly to FIG. 1, according to this Figure, a prior art frequency transmitter is known wherein the bearing 112 for the axle-drive bevel wheel housing or differential housing 113 is mounted in the axle gear housing 110 of the rear axle of a motor vehicle by means of a bearing cover 111. The output shaft 114 extends through the spur bevel gear housing 113 and passes over in this case directly into the joint part 115 of a synchronous joint. The arrangement is, of course, symmetrical to the longitudinal center plane of the differential gear.

The frequency transmitter 117 is furthermore arranged in the bearing cover 111 between the bearing 112 and an externally sealing retaining ring 116. The stationary part of the frequency transmitter consists of a disc-shaped armature 118 having the teeth 119 along its inner circumference. A spacer sleeve 120 is slotted in the longitudinal direction, so that the connecting wires 121 of the winding 122, devoid of a winding body, can be extended therethrough. An inclined bore 123 serves for the further guidance in the bearing cover 111. On the other side of the coil 122 is arranged a disc part 124 which is provided with longitudinal grooves 125 along the inner circumference thereof. The entire module heretofore described is pressed firmly by the retaining ring 116 against an annular shoulder 126 of the bearing cover 111 and forms the stator of the frequency transmitter 117.

The rotor is formed by a sleeve 127 which is pressed onto the shaft 114, the retaining ring 116 running on the outer circumference of this sleeve. The sleeve receives the magnetic flux from the disc part 124 and transmits this flux to a ring member 128 which, in turn, is pressed onto the shaft 114 and has the teeth 129 on its outer circumference. This ring lies in the same, axially normal plane as the armature 118 so that the two serrations 119 and 129 are in direct opposition to each other.

The mode of operation of such a frequency transmitter is known. It should be pointed out, in this connection, that one or several apertures 130 in the bearing cover 111 serve for an adequate throughflow of the oil to the frequency transmitter. The oil flows further through the serration, as well as through the longitudinal grooves 125 in the disc part 124, to the retaining ring 116 so that the latter can be kept sufficiently cooled. A certain circulation is formed thereby, so that oil is constantly supplied and discharged.

Figure 2:
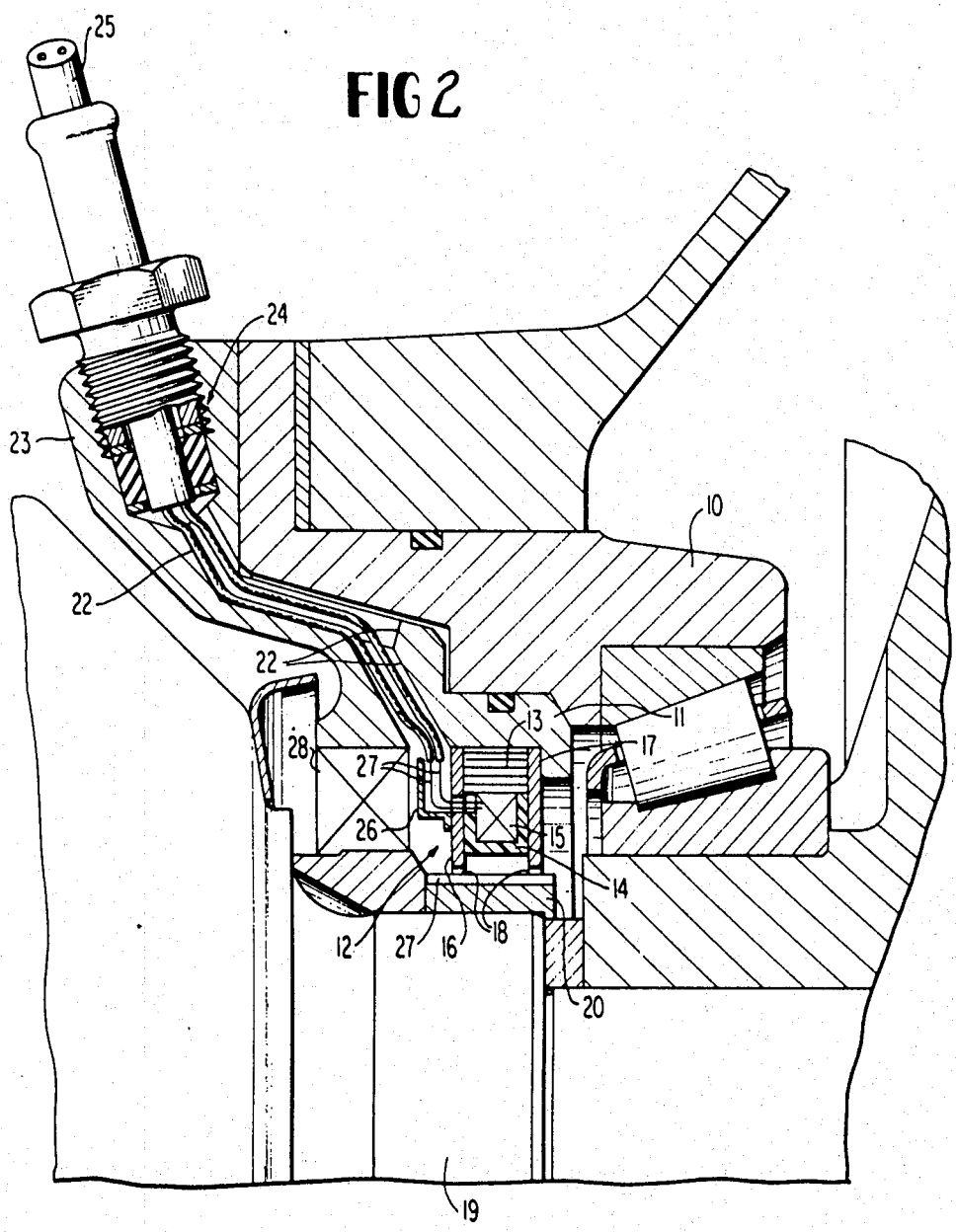
FIGS. 2 and 3 are partial cross-sectional views through two embodiments of ring-shaped frequency transmitters in accordance with the present invention.
Figure 3:
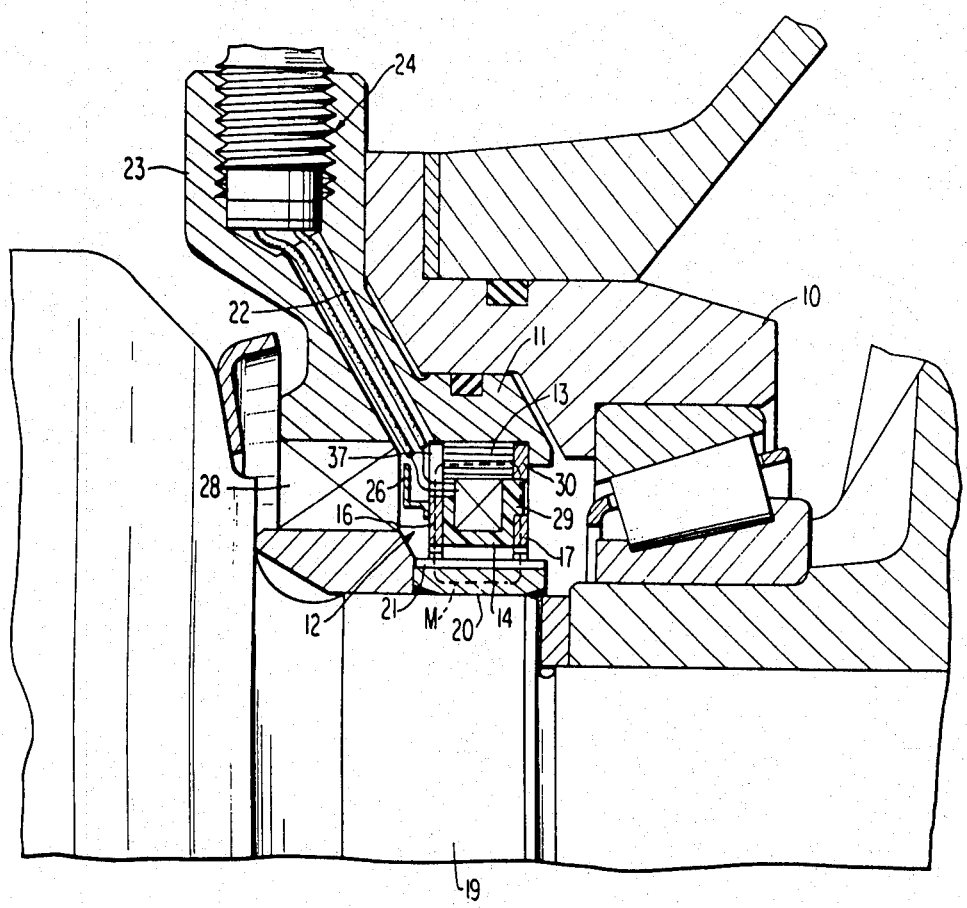

Referring now to FIGS. 2 and 3 of the drawing wherein like reference numerals are used throughout the two views to designate like parts, according to FIG. 1, the tapered roller bearing assembly 7 for the axle drive bevel wheel or differential housing 8 is mounted in the axle gear housing 9 of the rear axle of a motor vehicle by means of a bearing cover 10. The output or driven shaft 19 extends through the axle drive bevel wheel housing 8 and passes over directly into the joint part 6 of a synchronous or homokinetic joint of conventional construction. The arrangement, of course, is symmetrical to the longitudinal center plane of the differential gear assembly.

A ring-shaped frequency transmitter generally designated by reference numeral 12 is arranged at each bearing cover 10 of a differential gear assembly within a separate annular insert member 11; the frequency transmitter 12 thereby produces the signals for a conventional brake slippage control system not illustrated in detail herein since it forms no part of the present invention. The annular insert member 11 is made of a non-magnetic material, for example, of aluminum die-casting. It accommodates a ring-shaped permanent magnet 13 which is arranged concentrically about the coil carrier 14 with its coil 15. Two disks 16 and 17 of magnetically conductive material are disposed on both sides of this structural unit, which are provided at the inner circumference with teeth 18. These two disks 16 and 17 are so positioned and fixed with respect to one another that the toothed means thereof--in relation to the circumference--have exactly the same position.

A sleeve or bush 20 is secured over the output or driven shaft 19 which sleeve or bush carries a continuous toothed means 21 that is disposed opposite the two toothed means 18 provided at the disks 16 and 17. The magnetic flux therefore passes through the parts 13, 16, 17 and 20 and is guided through two active toothed means.

Bores or channels 22 are provided in the insert member 11 through which are extended the connecting lines. A larger opening is provided in an eye 23 of the insert member 11, in which is disposed the gland or packing box 24 for the feed cable 25. For the better soldering of the feed lines to the end of the coil wires a pocket 26 of synthetic plastic material is glued externally onto the outer disk 16; the pocket 26 receives and protects the connecting places 27 of the wires. The insert member 11 serves simultaneously for the accommodation of the retaining ring 28 constituting an oil seal which seals the frequency transmitter against the outside.

FIG. 2 illustrates basically the same construction as FIG. 1. Only the arrangement of the eye 23 and of the feed line bores 22 is chosen differently by reason of different space conditions.

The coil carrier 14 is provided for the alignment of the two disks 16 and 17 in the circumferential direction axially with mutually offset cams 29 which engage in corresponding apertures 30 provided in the two disks 16 and 17. In the illustrated case, the cams 29 are mutually offset in the circumferential direction, and more particularly, by a multiple of the tooth pitch. In this manner, the two teeth at the disks 16 and 17 are accurately aligned with respect to each other in a circumferential direction. The disk 16 is provided at the location of the externally mounted pockets 26 with a slot 31 for the better guidance of the connecting wires.

It can be readily seen from FIGS. 2 and 3 that by disposing the frequency transmitter arrangement at each output shaft in an insert member 11 in the bearing cover 10 between the tapered roller bearing assembly 7 and the oil seal retaining ring 28, the entire frequency transmitter 12 inclusive the annular insert member 11 can be pulled out and exchanged after the removal of the output or driven shaft 19 without having to disassemble or detach therefor the bearing cover 10. This is a considerable simplification in the structure as well as in the manufacture and assembly. Additionally, the magnetic flux — which is indicated in the drawing by the dash line M—is sharply concentrated so that very strong signals can be produced at the two active toothed means 16, 21 and 17, 21. This concentration is reinforced by the non-magnetic material of the annular insert member 11 because stray fluxes can be prevented thereby.

As indicated hereinabove, the transmitter arrangement of the present invention is disposed symmetrically with respect to the longitudinal center plane of the differential gear assembly; therefore, it is understood that a ring-shaped frequency transmitter arrangement of identical construction to that shown in FIGS. 1 and 2, respectively, is provided at the other output or driven shaft of the differential gear assembly.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A frequency transmitter for the generation of signals which is combined with a differential gear assembly, characterized in that a bearing cover means is provided at each output shaft of the differential gear assembly, an annular insert means is non-rotatably inserted along the axis of each output shaft from the outside of the differential gear assembly into the bearing cover means, said annular insert means including a coil carrier as well as two stationary toothed means and a permanent magnet of high energy yield, and in that a rotating toothed means is secured at the circumference of each output shaft of the differential gear assembly and cooperates with said two stationary toothed means to generate signals representative of the rotational speed of each output shaft.

2. A frequency transmitter according to claim 1, characterized in that the signals are used for the control of a brake force at wheels of motor vehicles.

3. A frequency transmitter according to claim 1, characterized in that the frequency transmitter is arranged in the bearing cover means between a bearing for one of the two parts consisting of the axle drive bevel wheel and differential housing, on the one hand, and an oil seal means, on the other.

4. A frequency transmitter according to claim 1, characterized in that the annular insert means consists of a non-magnetic material.

5. A frequency transmitter according to claim 4, characterized in that the annular insert means includes means for guiding cable leads of the transmitter, and mounting means for mounting a sealing retaining ring means.

6. A frequency transmitter according to claim 5, characterized in that the permanent magnet is constructed as an axially polarized ring magnet and is inserted into the annular insert means and in that the ring magnet receives concentrically within the same the coil carrier inclusive of the coil.

7. A frequency transmitter for the generation of signals which is combined with a differential gear assembly, characterized in that a bearing cover means is provided at each output shaft of the differential gear assembly, an annular insert means is non-rotatably inserted along the axis of each output shaft from the outside of the differential gear assembly into the bearing cover means, said annular insert means including a coil carrier as well as two stationary toothed means and a permanent magnet of high energy yield, a rotating toothed means is secured at the circumference of each output shaft of the differential gear assembly and cooperates with two stationary toothed means to generate signals representative of the rotational speed of each output shaft, the annular insert means consists of a non-magnetic material and includes means for guiding cable leads of the transmitter, mounting means for mounting a sealing retaining ring means, the permanent magnet is constructed as an axially polarized ring magnet and is inserted into the annular insert means, the ring magnet receives concentrically within the same the coil carrier inclusive of the coil, and in that one disc each of magnetically conductive material is arranged axially on both sides of the unit formed by the coil carrier and permanent magnet, said disks being provided at the inner circumference with toothed means, and in that both disks assume a substantially identical circumferential position in relation to the toothed means.

8. A frequency transmitter according to claim 7, characterized in that cam means are arranged at the coil carrier which engage substantially without play in corresponding apertures provided in the two disks.

9. A frequency transmitter according to claim 8, characterized in that the rotating toothed means is a continuous toothed means disposed opposite the toothed means of the two disks, which is arranged on a sleeve mounted over each output shaft of the differential gear assembly.

10. A frequency transmitter according to claim 9, characterized in that a pocket of insulating material is mounted externally on the axially outer disk, said pocket accommodates the coil connections.

11. A frequency transmitter according to claim 10, characterized in that the pocket means is made of synthetic plastic material.

12. A frequency transmitter according to claim 10, characterized in that the insert means is provided with a bore for connecting lines as well as with an eye means having a larger opening for the accommodation of a seal means for a feed cable.

13. A frequency transmitter for the generation of signals which is combined with a differential gear assembly, characterized in that a bearing cover means is provided at each output shaft of the differential gear assembly, an annular insert means is non-rotatably inserted along the axis of each output shaft from the outside of the differential gear assembly into the bearing cover means, said annular insert means including a coil carrier as well as two stationary toothed means and a permanent magnet of high energy yield, and in that a rotating toothed means is secured at the circumference of each output shaft of the differential gear assembly and cooperates with two stationary toothed means to generate signals representative of the rotational speed of each output shaft, and in that the permanent magnet is constructed as an axially polarized ring magnet and is inserted into the annular insert means, and in that the ring magnet receives concentrically within the same the coil carrier inclusive of the coil.

14. A frequency transmitter according to claim 13, characterized in that one disk each of magnetically conductive material is arranged axially on both sides of the unit including the coil carrier and permanent magnet, said disks being provided at the inner circumference with toothed means, and in that both disks assume a substantially identical circumferential position in relation to the toothed means.

15. A frequency transmitter according to claim 14, characterized in that cam means are arranged at the coil carrier which engage substantially without play in corresponding apertures provided in the two disks.

16. A frequency transmitter according to claim 14, characterized in that a rotating toothed means is a continuous toothed means disposed opposite the toothed means of the two disks, which is arranged on a sleeve mounted over each output shaft of a differential gear assembly.

17. A frequency transmitter according to claim 16, characterized in that cam means are arranged at the coil carrier which engage substantially without play in corresponding apertures provided in the two disks.

18. A frequency transmitter according to claim 14, characterized in that a pocket of insulating material is mounted externally on the axially outer disk, said pocket accommodates the coil connections.

19. A frequency transmitter for the generation of signals which is combined with a differential gear assembly, characterized in that a bearing cover means is provided at each output shaft of the differential gear assembly, an annular insert means is non-rotatably inserted along the axis of each output shaft from the outside of the differential gear assembly into the bearing cover means, said annular insert means including a coil carrier as well as two stationary toothed means and a permanent magnet of high energy yield, a rotating toothed means is secured at the circumference of each output shaft of the differential gear assembly and cooperates with said two stationary toothed means to generate signals representative of the rotational speed of each output shaft, and in that the annular insert means is provided with a bore for connecting lines as well as with an eye means having a larger opening for the accommodation of a seal means for a fed cable.

20. A frequency transmitter arrangement for a differential gear assembly including an axle gear housing, output shafts, axle drive bevel wheels, bearing means for said axle drive bevel wheels, a bearing cover means provided at each output shaft, and an oil seal means for sealing the assembly, the arrangement comprising: annular insert means disposed in each bearing cover means between the bearing means and the oil seal means, said annular insert means including a coil carrier means having a coil disposed therein, a stationary toothed means provided on each side of said coil carrier means, a permanent magnet of high energy yield operatively connected with said coil and disposed in said annular insert means, means provided on each output shaft cooperating with the stationary toothed means for providing a signal of the rotational speed of each output shaft.

21. An arrangement according to claim 20, wherein said permanent magnet is an axially polarized ring magnet, said coil carrier means and said coil being concentrically disposed within said ring magnet.

22. A frequency transmitter arrangement for a differential gear assembly including an axle gear housing, output shafts, axle drive bevel wheels, bearing means for said axle drive bevel wheels, a bearing cover means provided at each output shaft, and an oil seal means for sealing the assembly, the arrangement comprising: annular insert means disposed in each bearing cover means between the bearing means and the oil seal means, said annular insert means including oil carrier means having a coil disposed therein, a stationary toothed means provided on each side of said coil carrier means, a permanent magnet of high energy yield operatively connected with said coil and disposed in said annular insert means, means provided on each output shaft cooperating with the stationary toothed means for providing a signal of the rotational speed of each output shaft, said permanent magnet is an axially polarized ring magnet, said coil carrier means and said coil being concentrically disposed within said ring magnet, said stationary toothed means includes a pair of disks each of which is disposed on a respective side of said coil carrier means, each of said disks being provided at its inner circumference with a toothed portion, said toothed portions on said disks being in alignment.

23. An arrangement according to claim 22, wherein said means provided on each output shaft includes a sleeve portion secured thereon, said sleeve portion being provided with a continuous toothed portion cooperable with said stationary toothed portions provided on said disks.

24. An arrangement according to claim 23, wherein said annular insert means is provided with a surface portion upon which the oil seal means is mounted.

25. An arrangement according to claim 24, wherein the disk disposed nearest the oil seal means has mounted thereon a means for receiving and protecting the wire leads of said coil.

26. An arrangement according to claim 25, wherein said last-mentioned means includes a pocket of synthetic plastic material adhesively secured to said disk.

27. An arrangement according to claim 26, wherein said annular insert means consists of a non-magnetic material.

28. An arrangement according to claim 22, wherein means are provided for assuring accurate alignment of said toothed portions on said disks.

29. An arrangement according to claim 28, wherein said last-mentioned means includes cam means cooperable with said disks.

30. An arrangement according to claim 29, wherein said cam means are provided on said coil carrier, said cam means being mutually offset in the circumferential direction.

31. An arrangement according to claim 30, wherein said disks are provided with aperture means for receiving said cam means.

32. An arrangement according to claim 31, wherein the disk disposed nearest to the oil seal means has mounted thereon a means for receiving and protecting wire leads of said coil.

33. An arrangement according to claim 32, wherein said lastmentioned means includes a pocket of synthetic plastic material adhesively secured to said disk.

34. An arrangement according to claim 33, wherein said annular insert means consists of non-magnetic material.

* * * * *